US012667854B2

(12) United States Patent
Riccardi et al.

(10) Patent No.: US 12,667,854 B2
(45) Date of Patent: Jun. 30, 2026

(54) SOLENOID VALVE FOR DISPENSING A FLUID AND RELATIVE SPARE PARTS KIT

(71) Applicant: TECOMEC S.R.L., Reggio Emilia (IT)

(72) Inventors: Francesco Riccardi, Reggiolo (IT); Andrea Fornaciari, Reggio Emilia (IT)

(73) Assignee: TECOMEC S.R.L., Reggio Emilia (IT)

( * ) Notice: Subject to any disclaimer, the term of this patent is extended or adjusted under 35 U.S.C. 154(b) by 258 days.

(21) Appl. No.: 18/338,831

(22) Filed: Jun. 21, 2023

(65) Prior Publication Data

US 2023/0415176 A1 Dec. 28, 2023

(30) Foreign Application Priority Data

Jun. 28, 2022 (IT) ........................ 102022000013621

(51) Int. Cl.
*B05B 1/30* (2006.01)
*B05B 15/40* (2018.01)
*B05B 15/658* (2018.01)

(52) U.S. Cl.
CPC ............ *B05B 1/3013* (2013.01); *B05B 15/40* (2018.02); *B05B 15/658* (2018.02)

(58) Field of Classification Search
CPC ...... B05B 1/3013; B05B 15/40; B05B 15/658
See application file for complete search history.

(56) References Cited

U.S. PATENT DOCUMENTS 2,392,741 A * 1/1946 Hurlburt ............... F16K 31/408 137/614.16
3,784,154 A * 1/1974 Ostrowski ............. F16K 31/404 251/38

(Continued)

FOREIGN PATENT DOCUMENTS

DE 102015206854 A1 1/2016
EP 2413008 A1 2/2012

(Continued)

OTHER PUBLICATIONS

WO-2022041357 Translation (Year: 2022).*

(Continued)

*Primary Examiner* — Steven M Cernoch
(74) *Attorney, Agent, or Firm* — Chrisman Gallo Tochtrop LLC

(57) ABSTRACT

Solenoid valve (1) for dispensing a fluid, in particular a fluid for agricultural use, comprising a nozzle body (2) provided with an inlet section (2*a*), an outlet section (2*b*) of the fluid and an attachment portion (2*c*). The solenoid valve (1) further comprises a box-shaped body (3) connected or connectable to the attachment portion (2*c*) and comprising a solenoid (3*a*) and a movable core (3*b*) sliding between a first operating position and a second operating position. The solenoid valve (1) further comprises a connecting body (4) comprising a fixing component (4*a*) and a gasket (4*b*) interposed between the fixing component (4*a*) and the nozzle body (2). The solenoid valve (1) further comprises a hollow cylindrical body (6), retained by the gasket (4*b*) and configured to enable fluid to pass between the inlet section (2*a*) and the outlet section (2*b*), when the core (3*b*) is in the first operating position, and receive in abutment the core (3*b*), when the core (3*b*) is in the second operating position, so as to prevent fluid passing between the inlet section (2*a*) and the outlet section (2*b*).

17 Claims, 7 Drawing Sheets

(56) References Cited

U.S. PATENT DOCUMENTS

| | | | | | |
|---|---|---|---|---|---|
| 4,178,573 | A | * | 12/1979 | Swanson | H01F 7/1607 251/30.03 |
| 4,179,096 | A | * | 12/1979 | Fromfield | F16K 31/404 251/38 |
| 4,351,509 | A | * | 9/1982 | Stampfli | F16K 31/404 251/38 |
| 4,936,337 | A | * | 6/1990 | DuHack | F16K 31/408 137/329.04 |
| 5,269,333 | A | * | 12/1993 | Richmond | F16K 31/404 251/38 |
| 10,948,105 | B2 | * | 3/2021 | Hansen | F16K 47/14 |
| 2012/0025115 | A1 | | 2/2012 | Schiavone et al. | |
| 2020/0063886 | A1 | | 2/2020 | Schneider et al. | |

FOREIGN PATENT DOCUMENTS

| | | | | | |
|---|---|---|---|---|---|
| EP | 3382245 | A1 | | 10/2018 | |
| WO | WO-2022041357 | A1 | * | 3/2022 | F16K 1/46 |

OTHER PUBLICATIONS

Italian Search Report and Written Opinion from corresponding Italian Patent Application No. 10202200013621, Feb. 1, 2023, 8 pages.

* cited by examiner

SOLENOID VALVE FOR DISPENSING A FLUID AND RELATIVE SPARE PARTS KIT

The present invention relates to a solenoid valve for dispensing a fluid which is widely used in the agricultural sector.

The present invention also relates to a spare parts kit for the solenoid valve. As is known, the solenoid valves are used to spray the fields with fertilizers and/or similar products. The solenoid valves are usually mounted along a pipe in turn mounted on an agricultural vehicle equipped with a tank containing the liquid to be sprayed. In this situation, during the advancement of the agricultural vehicle on the field, the solenoid valves are opened or closed simultaneously or in a staggered manner with each other so as to nebulize the spraying liquid.

The known solenoid valves comprise a nozzle body provided with at least one fluid inlet conduit and at least one fluid outlet conduit. The nozzle body is engaged to a valve body provided with a seat inside which a stem set in motion slides by means of the action of a solenoid. This stem is configured to allow the passage or prevent the passage of the fluid from the inlet conduit to the outlet conduit.

In particular, the stem, in its motion, intercepts, by opening and closing, a passage gap so as to allow or not the passage of the fluid.

In the known solenoid valves, between the stem and the passage gap, there is interposed at least one gasket configured to act as a mechanical abutment for the stroke of the stem.

In the known solenoid valves there are also further gasket rings interposed between the nozzle body and the diaphragm so as to fix the nozzle body to the valve body.

Disadvantageously, the known solenoid valves have drawbacks mainly related to their structural complexity.

In detail, the known solenoid valves are particularly complex to disassemble and require the operator to intervene using specific tools.

A further disadvantage is also given by the method of assembling the components of the valve. In particular, since the diaphragm must engage with the gasket, the diaphragm has a shape such as to cause the deposit of the debris and the impurities left by the fluid.

The structural complexity of the solenoid valve therefore makes the maintenance and disassembly (as well as the assembly) of the known solenoid valves particularly expensive in terms of time and cost.

The technical task of the present invention is therefore to make available a solenoid valve that is able to overcome the drawbacks which have emerged from the prior art.

The subject-matter of the present invention is therefore to make available a solenoid valve that is quick and easy to disassemble and assemble.

In particular, the subject-matter of the present invention is to provide a solenoid valve that can be easily disassembled and assembled so as not to require particular tools and to allow inspection and maintenance operations, which can be carried out by non-specialized personnel, even on an agricultural field.

A further object of the present invention is therefore to make available a solenoid valve that allows to more easily remove the deposit of debris contained in the fluid that flows in the solenoid valve itself and in particular to also access the individual components to carry out cleaning operations.

A further object of the present invention is to make available a solenoid valve that allows the easy release of some components for possible replacements or maintenance operations.

The stated technical task and specified objects are substantially achieved by a solenoid valve comprising the technical features set forth in one or more of the appended claims. The dependent claims correspond to possible embodiments of the invention.

In particular, the specified technical task is substantially achieved by a solenoid valve for dispensing a fluid, in particular a fluid for agricultural use, comprising a nozzle body provided with a fluid inlet section and a fluid outlet section. The nozzle body further comprises an attachment portion interposed between the inlet section and the outlet section. The solenoid valve, subject-matter of the present invention, further comprises a box-shaped body connected or connectable, through reversible hooking means, to the attachment portion of the nozzle body comprising a solenoid and a movable core sliding within the solenoid itself between a first operating position and a second operating position. The solenoid valve further comprises a connecting body comprising a fixing component, fixed or fixable to the box-shaped body so as to define a passage seat for the core, and a gasket fixed or fixable to the attachment portion so as to be interposed between the fixing component and the nozzle body. The solenoid valve further comprises a hollow cylindrical body, retained by the gasket fixed to the attachment portion and so as to be contained at least partially in the passage seat of the core, and configured to enable fluid to pass between the inlet section and the outlet section of the nozzle body, when the core is in the first operating position in which the core is spaced apart from the hollow cylindrical body, and receive in abutment the core itself, when the core is in the second operating position, so as to prevent fluid passing between the inlet section and the outlet section.

Advantageously, the fact that the core comes directly into abutment with the hollow cylindrical body allows to avoid the interposition of further sealing elements making the assembly and disassembly of the solenoid valve simple and fast, with direct access to all the components for inspection, maintenance and cleaning operations.

Advantageously, the absence of mounting screws for the assembly of the solenoid valve contributes to making the latter further easy to disassemble and maintain.

Advantageously, the presence of removable hooking means enables the decoupling and coupling of the housed coil, within the box-shaped body from the solenoid to carry out rapid component replacement and maintenance operations.

Preferably, the solenoid valve further comprises a filtering element configured to filter impurities contained in the entering fluid. This filtering element is retained between the fixing component and the hollow cylindrical body.

Advantageously, the filtering element makes the operation of cleaning the sediments from the solenoid valve easy as it is sufficient to remove said element and replace it with a new one which in combination with the ease of assembly and disassembly of the solenoid valve makes this operation simple and fast.

Further characteristics and advantages of the present invention will become more apparent from the indicative and thus non-limiting description of an embodiment of a solenoid valve.

Such a description will be set out below with reference to the accompanying drawings, which are provided solely for illustrative and therefore non-limiting purposes, in which.

With reference to the accompanying figures, 1 denotes a solenoid valve for dispensing a fluid, in particular a fluid for agricultural use, and 100 denotes a spare parts kit for replacing the moving parts of the solenoid valve 1. The term "fluid for agricultural use" means products such as fertilisers, manures, herbicides, fungicides and other solutions used in agriculture.

The solenoid valve 1, subject-matter of the present invention, comprises a nozzle body 2 provided with a fluid inlet section 2*a* and a fluid outlet section 2*b*. The nozzle body 2 further comprises an attachment portion 2*c* interposed between the inlet section 2*a* and the outlet section 2*b*.

Preferably, the attachment portion 2*c* comprises an inlet conduit 2*c*' communicating with the inlet section 2*a* and an outlet conduit 2*c*" coaxial with the inlet conduit 2*c*' and communicating with the outlet section 2*b*.

Figure 2:
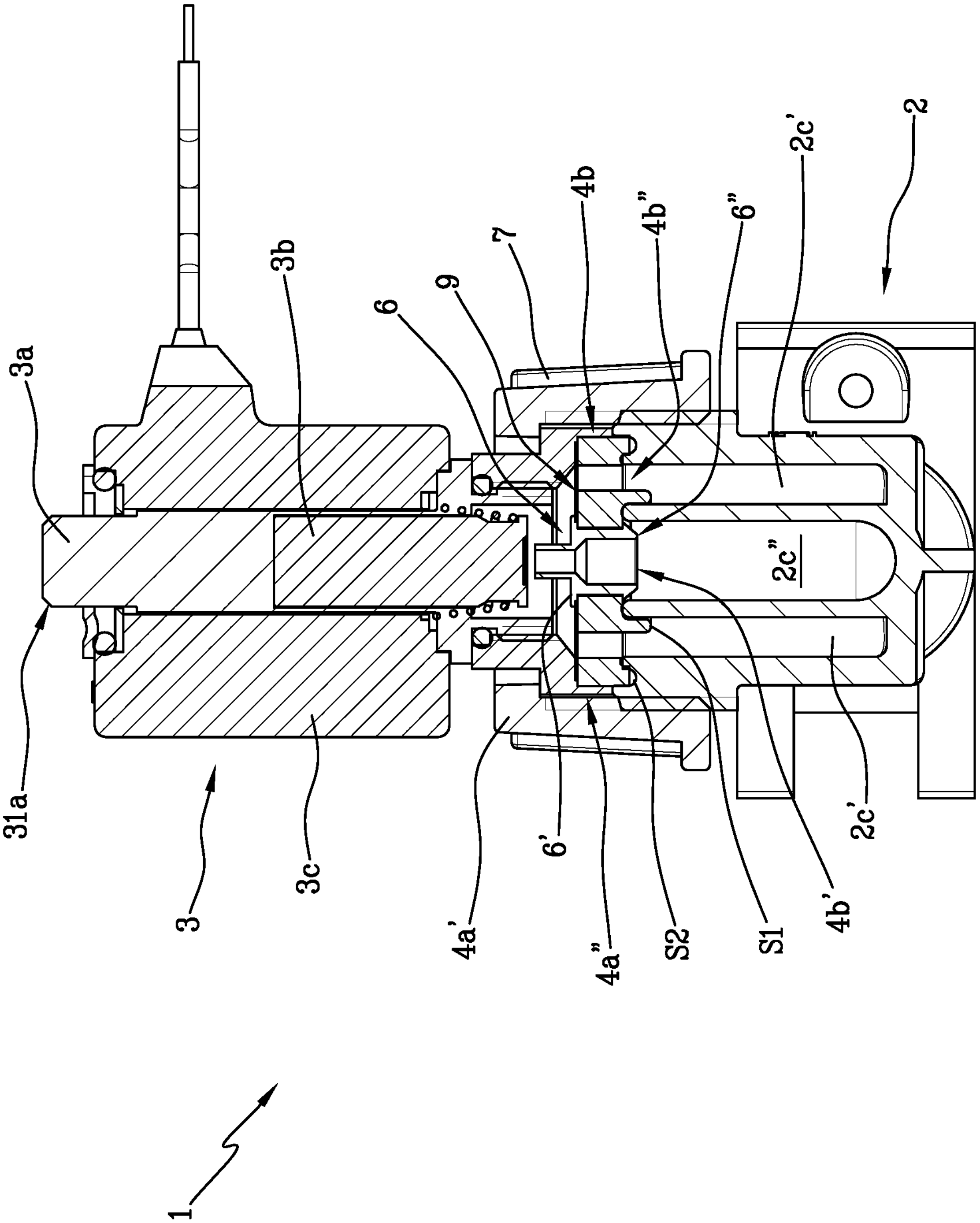
FIG. 2 shows a sectional view of the solenoid valve of FIG. 1.

Even more preferably, as shown in the section of FIG. 2, the outlet conduit 2*c*" is coaxially internal to the inlet conduit 2*c*'.

The solenoid valve 1 further comprises a box-shaped body 3 connected or connectable to the attachment portion 2*c* of the nozzle body 2.

Said box-shaped body 3 comprises a solenoid 3*a* and a movable core 3*b* sliding within the solenoid 3*a* between a first operating position and a second operating position as will be described in detail below. In other words, the box-shaped body 3 is provided with a seat within which the solenoid 3*a* is at least partially coupled, keeping it facing the attachment portion 2*c*.

Preferably, the box-shaped body 3 further comprises a coil 3*c* configured to supply an electric current to the solenoid 3*a* so as to create a magnetic field to move the core 3*b*.

Figure 4:
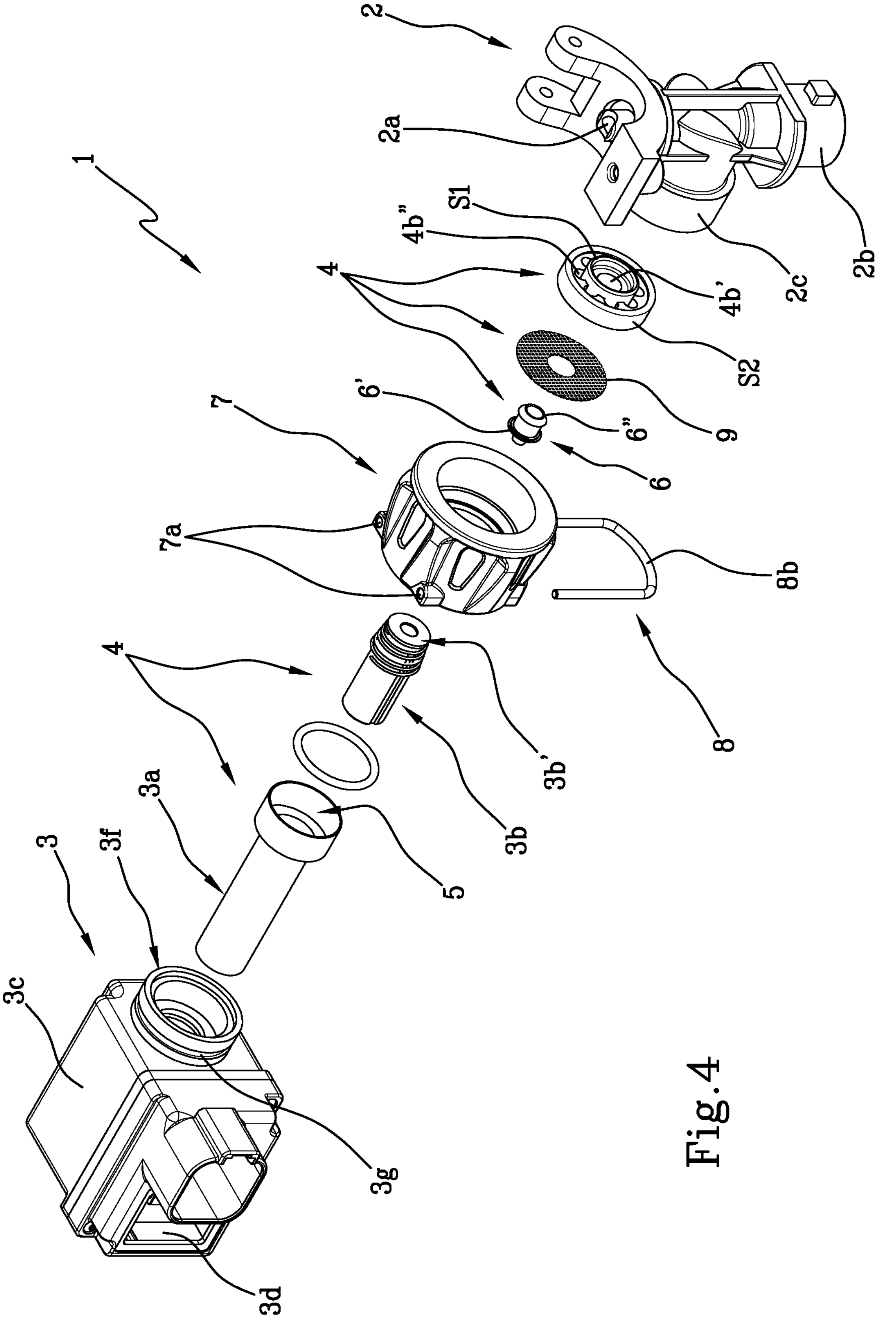
FIG. 4 shows an exploded view of a second variant of a solenoid valve according to the present invention.
Figure 5:
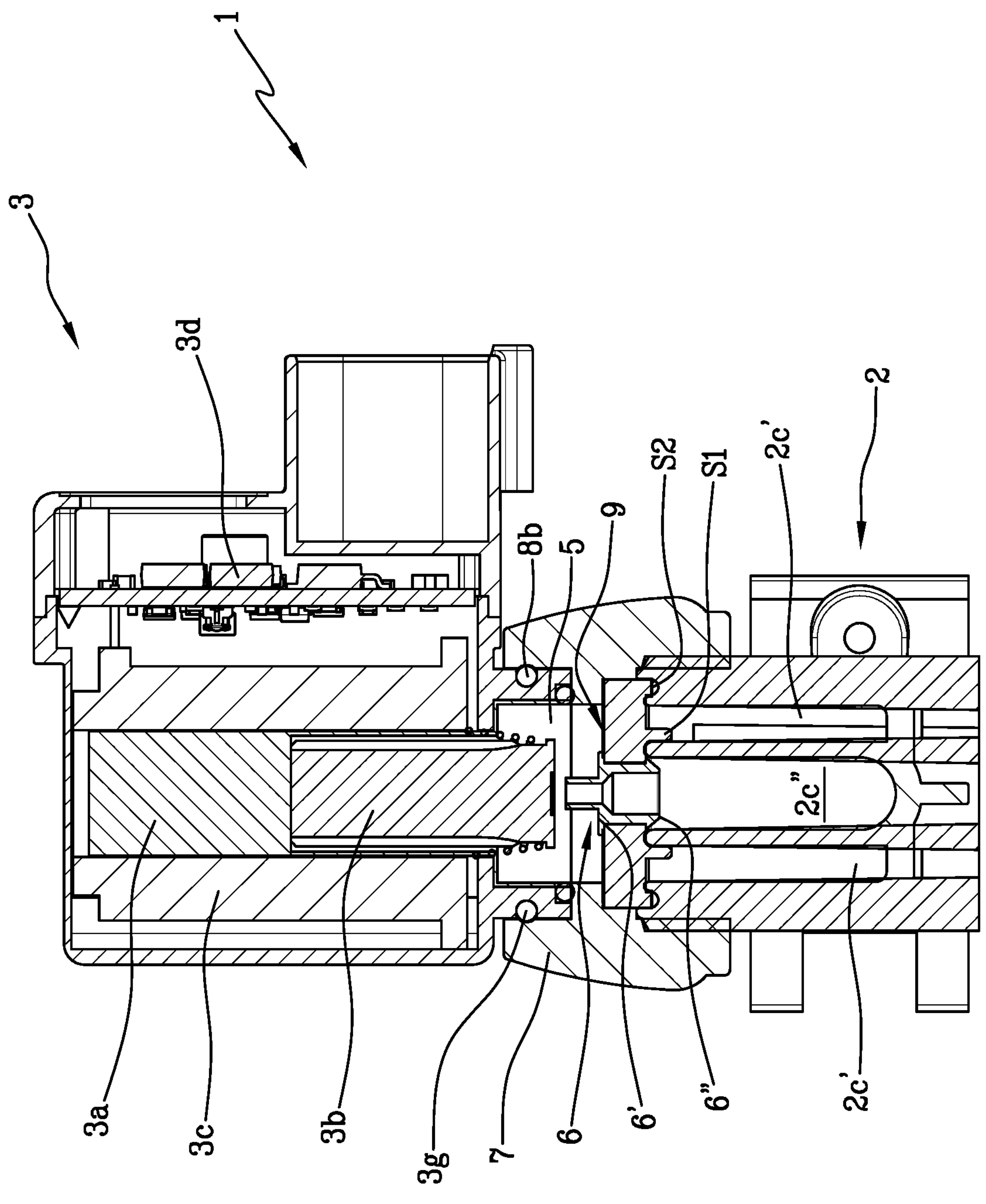
FIG. 5 shows a sectional view of the solenoid valve of FIG. 4.

Even more preferably, as illustrated in the second variant of FIGS. 4-5, the coil 3*c* can be further configured to interact with a control unit 3*d* able to control the coil 3*c* of the solenoid valve 1 so as to manage the flow of the fluid to be dispensed.

Figure 1:
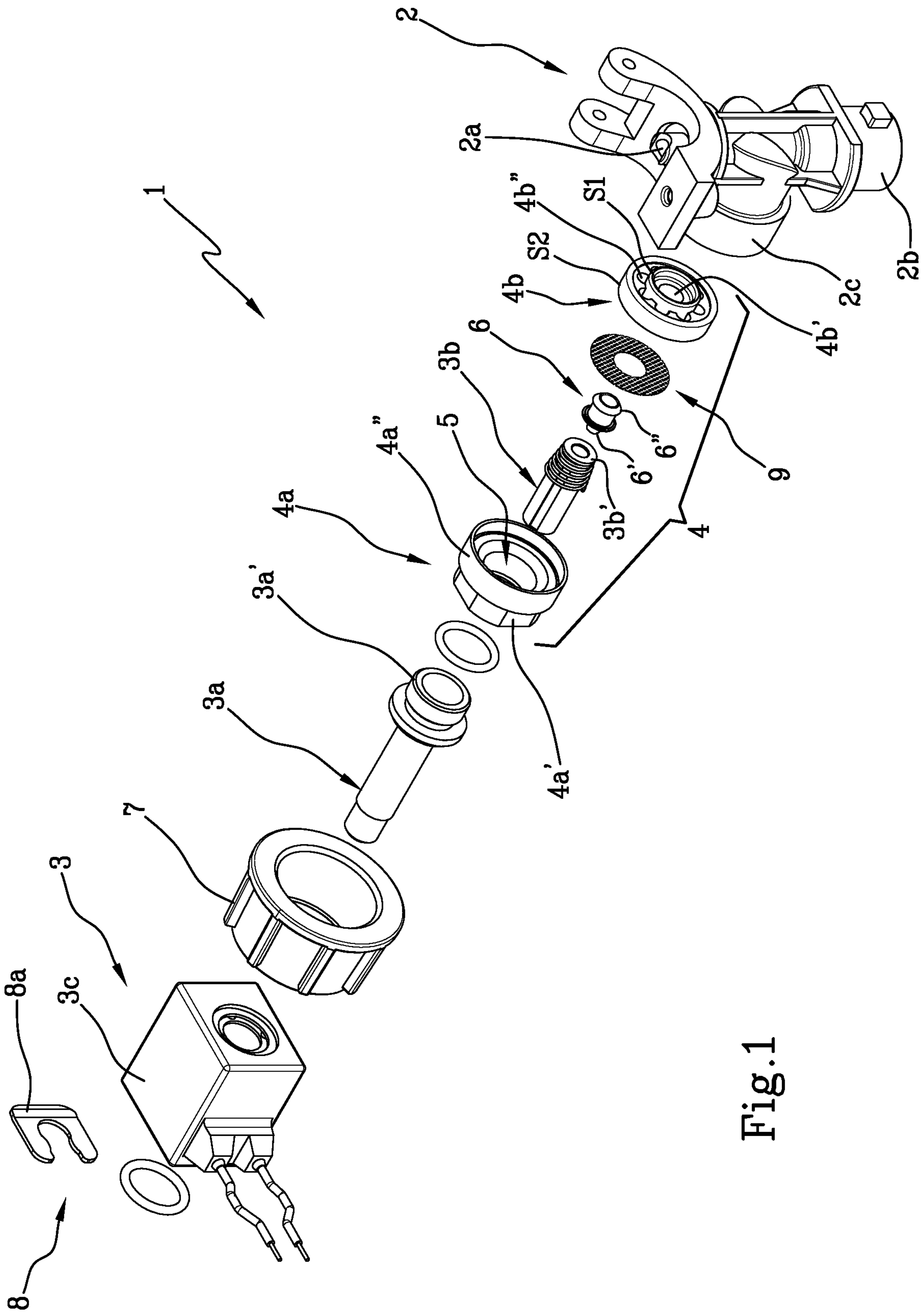
FIG. 1 shows an exploded view of a first variant of a solenoid valve subject-matter of the present invention.
Figure 3:
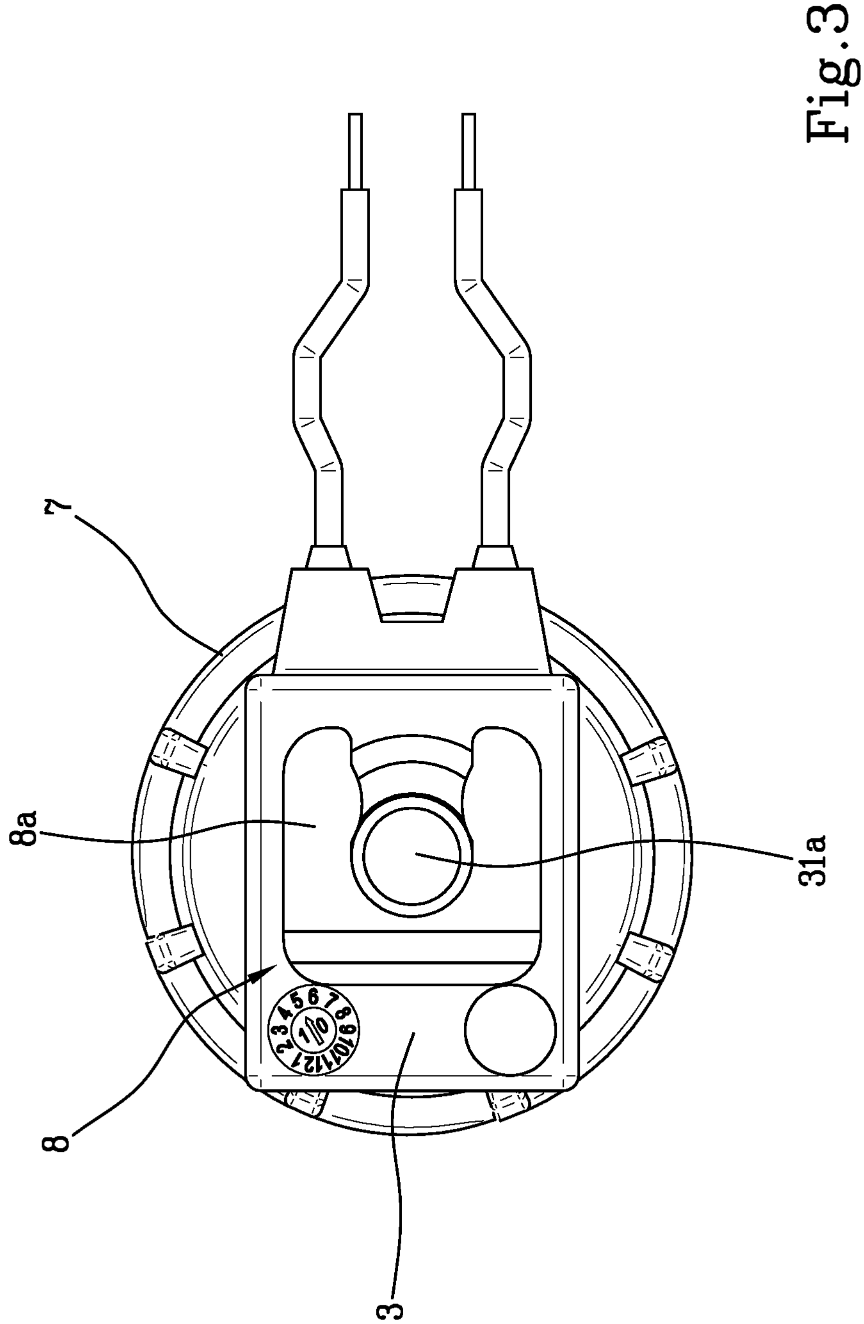
FIG. 3 shows a plan view of the solenoid valve of FIG. 1.

As shown in the variant of FIGS. 1-3, the solenoid valve 1 further comprises a connecting body 4 having a fixing component 4*a*, fixed or fixable to the box-shaped body 3 so as to define a passage seat 5 for the core 3*b*.

Preferably, the fixing body 4*a* is substantially hollow and has a first portion 4*a*' with shaped section and a second portion 4*a*" with circular section having a larger diameter than the first portion 4*a*'. In greater detail, a first opening is obtained in the first portion 4*a*' while a second opening communicating with the first opening and having a diameter greater than the first opening is obtained in the second portion 4*a*". Such openings define the passage seat 5 for the core 3*b* during its sliding motion.

In the embodiment shown in the accompanying FIGS. 1-3, the solenoid 3*a* comprises a portion 3*a*' at least partially protruding from the box-shaped body 3 and configured to be inserted, for example by threaded coupling, within the first portion 4*a*' of the fixing component 4*a*. In such a situation, the passage seat 5 for the core 3*b* is thus delimited by the first opening made in the first portion 4*a*' of the fixing body 4*a* into which the portion 3*a*' of the solenoid 3*b* is inserted and by the second opening made on the second portion 4*a*" of the fixing body 4*a*.

To retain the fixing body 4*a* in position, like for example represented in the preferred embodiment, the connecting body 4 is externally wrapped by a sealing element 7 having an end engaged with the box-shaped body 3 and an end engaged with the nozzle body 2. Preferably, the sealing element 7 also has an internal shaping, for example a circular rib, configured to retain the fixing body 4*a*.

In the variant embodiment illustrated in FIGS. 4-5, the connecting body 4 is replaced by a flange integrated in the box-shaped body 3. In this variant the sealing element 7 is directly coupled to the flange integrated in the box-shaped body 3

The coupling between sealing element 7 and box-shaped body 3 is implemented through the use of reversible hooking means 8.

In a first embodiment, applied to the first and second variants of solenoid valve 1 illustrated in FIGS. 1-3, the reversible hooking means 8 is defined by a fixing clip 8*a*.

In said first embodiment, the solenoid 3*a* has a head portion 31*a* passing through the box-shaped body 3 and emerging therefrom. The reversible hooking means 8 intercept the head portion 31*a* making an integral connection between the solenoid 3*a* and the box-shaped body 3.

In other words, the fixing clip 8*a* intercepts the head portion 31*a* and, by effect of an abutment surface of the fixing clip 8*a*, prevents the solenoid 3*a* from being able to slip off the box-shaped body 3.

In the event that it is necessary to replace the box-shaped body 3, and with it the coil 3, it is sufficient to release the reversible hooking means 8 to disconnect the box-shaped body 3 from the solenoid 3*a*.

In the second embodiment of the solenoid valve 1 illustrated in FIGS. 4-5, the reversible hooking means 8 is defined by a fork 8*b*.

In said second embodiment, the sealing element 7 has a pair of through holes 7*a*, transversely passing through the sealing element 7 and the box-shaped body 3 has a protuberance 3*f* with a circular groove 3*g*.

The reversible hooking means 8 is coupled in the pair of through holes 7*a* by intercepting the groove 3*g* therein.

In other words, the fork 8*b* has a pair of arms coupled in the pair of through holes 7*a* and the spacing between the arms is such as to trap the groove 3*g* of the protuberance 3*f* therein.

Also in this case, when it is necessary to replace the box-shaped body 3*a* and with it the coil 3*c* it is sufficient to release the reversible hooking means 8 to disconnect the box-shaped body 3 from the sealing element 7.

As shown in the accompanying figures, the connecting body 4 further comprises a gasket 4*b* fixed or fixable to the attachment portion 2*c* so as to be interposed between the fixing component 4*a* and the nozzle body 2.

Preferably, the gasket 4*b* comprises a main conduit 4*b*' coaxial to the outlet conduit 2*c*" of the valve body 2 and at least one secondary conduit 4*b*" in fluid communication with the inlet conduit 2*c*' of the valve body 2.

In the preferred embodiment, the at least one secondary conduit 4*b*" is further in fluid communication with the second portion 4*a*" of the fixing component 4*a* and therefore with the passage seat 5 so that the fluid can flow from the inlet conduit 2*c*' to the passage seat 5. In such a situation, the fluid entering the inlet conduit 2*c*' passes within the at least one secondary conduit 4*b*" and flows into the passage seat 5 as will be described in detail below.

As shown in the accompanying figures, the gasket 4*b* further comprises a first circular projection "S1" extending along an outer edge of the gasket 4*b* and configured to engage within a respective circular recess obtained in an outer wall of the attachment portion 2*c* and a second circular projection "S2" extending around the main conduit 4*b*' and configured to be inserted at least partially within the inlet conduit 2*c*'. The first circular projection "S1" and the second circular projection "S2" delimit the at least one secondary conduit 4*b*".

In a preferred embodiment, as visible in FIGS. 1 and 4, the secondary conduit 4*b*" is defined by a series of openings, for example having a circular or semicircular section, angularly distributed around the main conduit 4*b*', while the main conduit 4*b*' is substantially defined by a through hole.

In other words, the gasket 4*b* is shaped so as to engage with the nozzle body 2 by means of the circular projections "S1", "S2" to allow the entry of the fluid from the inlet conduit 2*c*' to the passage seat 5 and subsequently from the passage seat 5 itself to the outlet conduit 2*c*" when the core 3*b* is in the first operating position.

Advantageously, the fact that the gasket 4*b* is fixed to the attachment portion 2*c* of the nozzle body 2, for example by means of a shape coupling defined by the recesses and by the projections "S1", "S2", makes it possible to facilitate and speed up the assembly and disassembly of the solenoid valve 1 without the need to intervene with appropriate tools.

The solenoid valve 1, subject-matter of the present invention, further comprises a hollow cylindrical body 6 retained by the gasket 4*b*, fixed to the attachment portion 2*c*, so as to be contained at least partially in the passage seat 5.

In particular, as shown in FIGS. 2 and 5, it is the main conduit 4*b*' of the gasket 4*b* that is configured to retain the hollow cylindrical body 6. In such a situation, the fluid to be dispensed, once arrived at the passage seat 5 passes within the hollow cylindrical body 6 to outflow from the outlet conduit 2*c*" of the attachment portion 2*c* of the nozzle body 2.

The fact that the hollow cylindrical body 6 is retained by the gasket 4*b*, and in particular by the main conduit 4*b*', is particularly advantageous since it is possible that several nozzle bodies 2 have different diameters of outlet ducts 2*c*". In this situation, in order to adapt the gasket 4*b* to the nozzle 2, the diameter of the main conduit 4*b*' of the gasket 4*b* must simply be adapted so that it complies with the outlet conduit 2*c*" and the relative hollow cylindrical body 6.

As previously described, the hollow cylindrical body 6 is configured to allow fluid to pass between the inlet section 2*a* and the outlet section 2*b* of the nozzle body 2. In particular, the passage of fluid is allowed when the core 3*b* is in the first operating position in which the core 3*b* is spaced apart from the hollow cylindrical body 6. In such a configuration, the core 3*b* is inserted into the box-shaped body 3 so that an end portion thereof is inserted into the first portion 4*a*' of the fixing body 4*a*. In doing so, the fluid entering the inlet conduit 2*c*' passes through the at least one secondary conduit 4*b*" towards the passage seat 5. In such a situation, the fluid passes within the hollow cylindrical body 6 and flows into the outlet conduit 2*c*" of the attachment portion 2*c* of the nozzle body 2.

The hollow cylindrical body 6 is further configured to receive in abutment the core 3*b* when the core 3*b* is in the second operating position so as to prevent fluid passing between the inlet section 2*a* and the outlet section 2*b*. In such a configuration, the core 3*b* projects from the first portion 4*a*' of the fixing body 4*a* so as to close the passage defined by the hollow cylindrical body 6 by preventing the fluid from passing from the passage seat 5 to the outlet conduit 2*c*" of the attachment portion 2*c*.

In use, when the core 3*b* is in the first operating position, i.e. it is distal with respect to the hollow cylindrical body 6, the fluid is free to flow defining a flow between the inlet conduit 2*c*' and the outlet conduit 2*c*". In other words, the fluid defines a flow that from the inlet conduit 2*c*', passes through the secondary conduit 4*b*" made in the gasket 4*b*, flows within the passage seat 5 defined by the fixing component 4*a* and from the passage seat 5 passes through the hollow cylindrical body 6, inserted in the main conduit 4*b*' of the gasket 4*b*, outflowing through the outlet conduit 2*c*".

On the contrary, when the core 3*b* is in the second operating position, i.e. it is in abutment with the hollow cylindrical body 6, the flow of fluid is prevented and therefore the core 3*b* prevents the fluid from flowing inside the hollow cylindrical body 6 towards the outlet conduit 2*c*".

Preferably, the hollow cylindrical body 6 projects slightly from the main conduit 4*b*' so as to present a first surface 6' partially inserted in the passage seat 5 and a second surface 6", opposite to the first surface 6', at least partially inserted in the outlet conduit 2*c*".

More in detail, the first surface 6' faces the core 3*b* and is shaped so as to have a circular crown configured to rest directly on the gasket 4*b*.

In the embodiment illustrated in the accompanying figures, also the second surface 6" of the hollow cylindrical body 6, inserted in the outlet conduit 2*c*", has a circular crown resting on the gasket 4*b* in such a way that the hollow cylindrical body 6 is locked inside the gasket 4*b* itself.

Advantageously, this conformation of the cylindrical body 6 allows the latter to remain firmly in position without the need to introduce additional gaskets or screws.

When the core 3*b* is in the second operating position, the flow of fluid is totally prevented and there are no leaks, the hollow cylindrical body 6 comprises a surface 6' (coincident with the aforementioned first surface) counter-shaped on an end surface 3*b*' of the core 3*b* such that the end surface 3*b*' adheres to the hollow cylindrical body 6.

Advantageously, the fact that the core 3*b* is in direct mechanical abutment with the hollow cylindrical body 6 allows to avoid the interposition of further fixing elements and/or gaskets that would make it difficult to disassemble the solenoid valve 1 during maintenance.

In use, to prevent or allow the passage of fluid through the solenoid valve 1, the core 3*b* is moved in sliding, thanks to the action of the solenoid 3*a*, between the first operating position, in which it is distal with respect to the hollow cylindrical body 6 and allows the fluid to pass from the inlet conduit 2*c*' to the outlet conduit 2*c*" through the hollow cylindrical body 6 itself, and the second operating position, in which the core 3*b* is in abutment with the counter-shaped surface 6' of the hollow cylindrical body 6 so as to obstruct the outlet conduit 2*c*" and prevent the fluid from passing.

Preferably, the core 3*b* can also maintain an intermediate position between the first operating position, in which the flow of fluid is maximum, and the second operating position, in which the flow of fluid is nil, so as to allow a smaller flow of fluid to pass from the inlet conduit 2*c*' to the outlet conduit 2*c*".

In a preferred embodiment, the solenoid valve 1 further comprises a filtering element 9 configured to filter impurities contained in the fluid entering the solenoid valve 1 itself.

The purpose of the filtering element 9 is to prevent large-sized impurities from interfering with the movement of the core 3*b* within the solenoid 3*a* generating malfunctions and even seizures therebetween.

Preferably, but not in a limiting manner, the filtering element 9 is made in the form of a wire mesh.

The filtering element 9 is retained between the fixing component 4*a* and the hollow cylindrical body 6.

Advantageously, the presence and the positioning of the filtering element 9 allow to extend the useful life of the gasket 4*b* as they prevent impurities present in the fluid from ruining and/or clogging the gasket 4*b*.

Advantageously, the presence and the positioning of the filtering element 9 allow to obtain an easier and faster maintenance since it is enough to replace the filtering element 9 without completely disassembling the solenoid valve 1.

Preferably, the filtering element 9 has a substantially circular shape having a central hole to enable the hollow cylindrical body 6 to be inserted into the gasket 4*b*.

In use, the fluid passes from the inlet conduit 2*c*' of the attachment portion 2*c* to the secondary conduit 4*b*". Between the gasket 4*b* and the fixing component 4*a*, i.e. in the passage between the secondary conduit 4*b*" and the passage seat 5, the fluid passes through the filtering element so that the impurities remain trapped therein. Subsequently, if the core 3*b* is in the second operating position, i.e. if it is spaced apart from the hollow cylindrical body 6, the fluid passes from the passage seat 5 in the hollow cylindrical body 6 towards the outlet conduit 2*c*".

Figure 6:
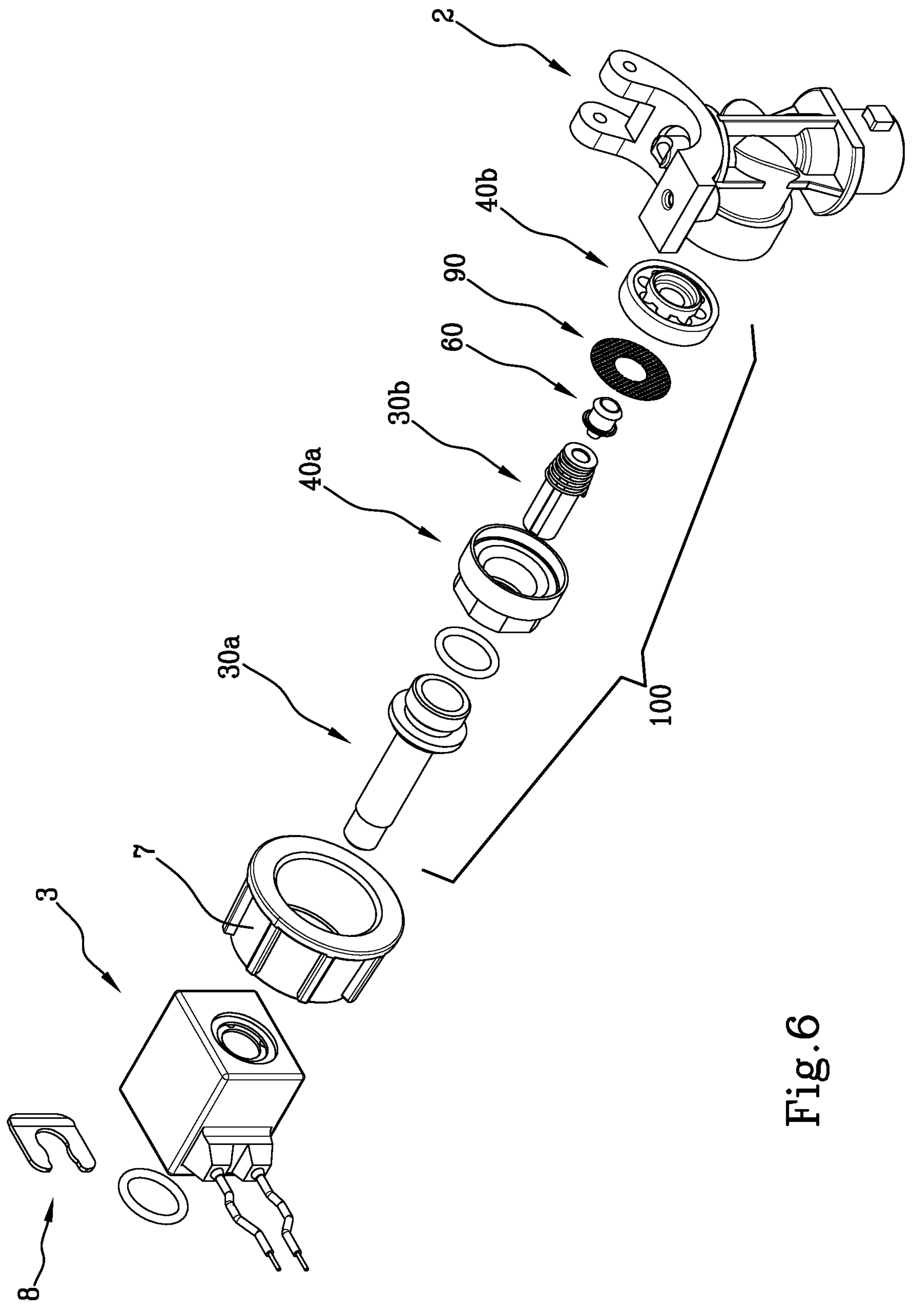
FIG. 6 shows a spare parts kit for the solenoid valve of FIGS. 1-3.
Figure 7:
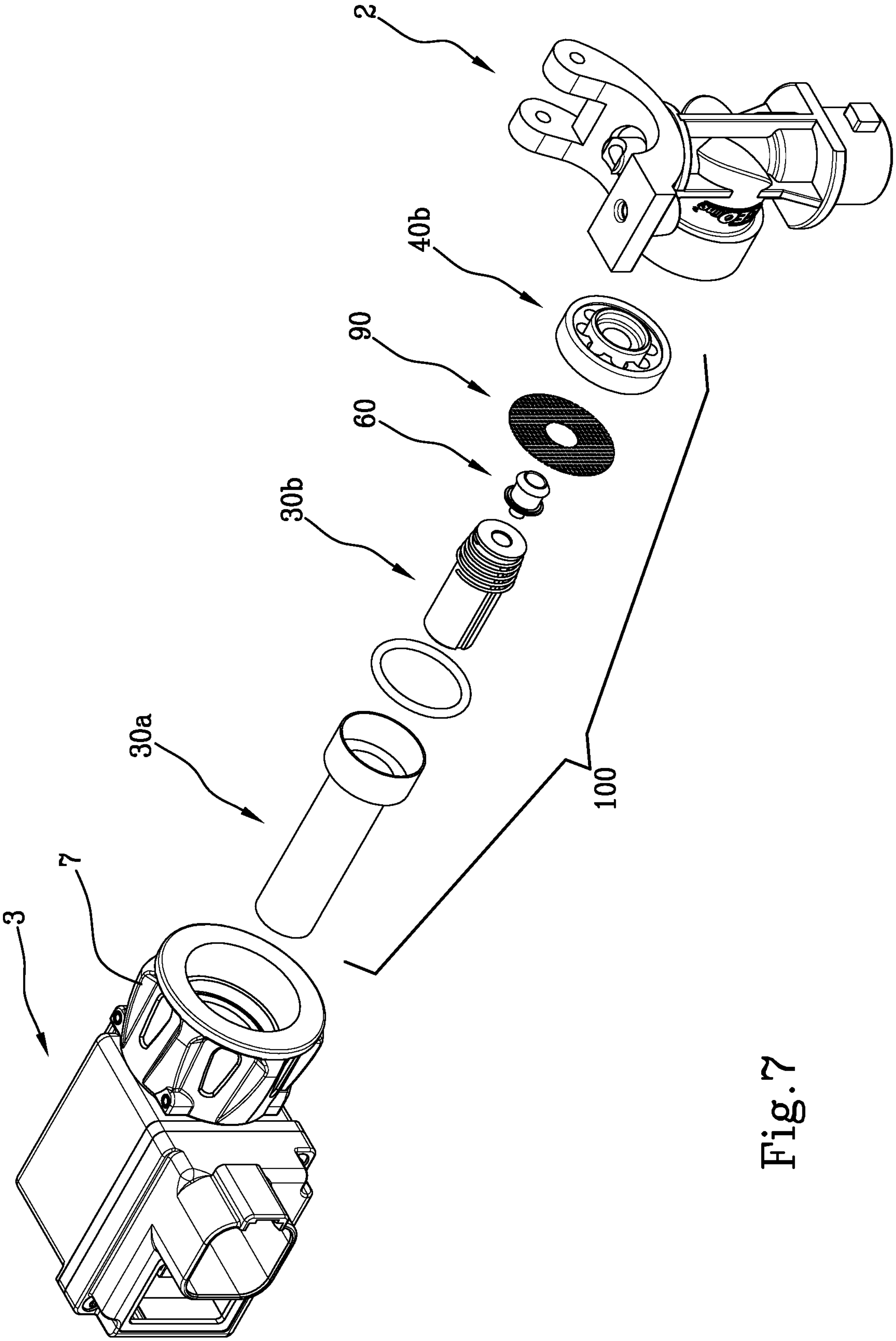
FIG. 7 shows a spare parts kit for the solenoid valve of FIGS. 4-5.

FIG. 6 illustrates the spare parts kit 100 for the first variant of solenoid valve 1, illustrated in FIGS. 1-3, and FIG. 7 illustrates the spare parts kit 100 for the second variant of solenoid valve 1, illustrated in FIGS. 4-5.

The kit 100 comprises the parts of the solenoid valve 1 most subject to wear, i.e. the parts that are, during normal operation of the solenoid valve 1, in motion.

More specifically, the kit 100 comprises at least one replacement solenoid 30*a*, a replacement core 30*b*, the replacement hollow cylindrical body 60, a replacement gasket 40*b* and a replacement filtering element 90.

For the first variant of solenoid valve, illustrated in the figure, in FIGS. 1-3, the kit 100 may also comprise a replacement fixing component 40*a*.

By supplying the kit 100 to a user, the latter will be able, by decoupling the sealing element 7 without the use of specific tools, to access directly inside the solenoid valve 1 and evaluate whether to replace worn parts. In this way it will be possible to restore the correct operation of the solenoid valve without replacing the electronic part.

The present invention achieves the proposed objects, eliminating the drawbacks that have emerged from the known art.

In particular, the possibility of closing the core 3*b* in abutment directly on the gasket 4*b* simplifies the structure of the entire solenoid valve 1 greatly facilitating the assembly and disassembly thereof so as to allow the operator not to have to intervene with specific tools.

The presence of the filtering element 9 allows to reduce the wear and the phenomena of clogging of the gasket 4*b* and therefore of the entire solenoid valve 1.

The invention claimed is:

1. A solenoid valve (1) for dispensing a fluid, in particular a fluid for agricultural use, comprising:

a nozzle body (2) provided with an inlet section (2*a*) of said fluid and an outlet section (2*b*) of said fluid, said nozzle body (2) further comprising an attachment portion (2*c*) interposed between said inlet section (2*a*) and said outlet section (2*b*), said attachment portion (2*c*) comprising an inlet conduit (2*c*') communicating with said inlet section (2*a*) and an outlet conduit (2*c*") coaxial with said inlet conduit (2*c*') and communicating with the outlet section (2*b*);

a box-shaped body (3) connected or connectable to the attachment portion (2*c*) of the nozzle body (2) and comprising a solenoid (3*a*) and a movable core (3*b*) sliding within said solenoid (3*a*) between a first operating position and a second operating position, a gasket (4*b*) comprises a main conduit (4*b*'), coaxial with said outlet conduit (2*c*") of a valve body (2) of the solenoid valve (1) and configured to retain a hollow cylindrical body (6), and at least one secondary conduit (4*b*") in fluid communication with said inlet conduit (2*c*') of the valve body (2) and a passage seat (5) of the core (3*b*); and a connecting body (4) fixed or fixable to said box-shaped body (3) so as to define said passage seat (5) for said core (3*b*), and said gasket (4*b*) fixed or fixable to said attachment portion (2*c*) so as to be interposed between the connecting body (4) and said nozzle body (2);

the hollow cylindrical body (6), having a first surface resting on said gasket (4*b*) for locking the hollow cylindrical body (6) inside of said gasket (4*b*) fixed to the attachment portion (2*c*), and so as to be contained at least partially in said passage seat (5) of the core (3*b*), and configured to enable fluid to pass between the inlet section (2*a*) and the outlet section (2*b*) of the nozzle body (2), when the core (3*b*) is in said first operating position in which the core (3*b*) is spaced apart from said hollow cylindrical body (6), and receive in abutment said core (3*b*), when the core (3*b*) is in said second operating position, so as to prevent fluid passing between said inlet section (2*a*) and said outlet section (2*b*);

wherein said gasket (4*b*) comprises a first circular projection (S2) extending along an outer edge of said gasket (4*b*) and configured to engage within a respective circular recess obtained in an outer wall of said attachment portion (2*c*) and a second circular projection (S1) extending around said main conduit (4*b*') and configured to be inserted at least partially within and contacting a wall of said inlet conduit (2*c*'), said first circular projection (S2) and said second circular projection (S1) delimiting said at least one secondary conduit (4*b*").

2. The solenoid valve (1) according to claim 1, wherein said hollow cylindrical body (6) comprises a surface (6') counter-shaped on an end surface (3*b*') of said core (3*b*) such that said end surface (3*b*') adheres to said hollow cylindrical body (6) when the core (3*b*) is in said second operating position.

3. The solenoid valve (1) according to claim 2, wherein said counter-shaped surface (6') faces said passage seat (5) and is shaped so as to have a circular crown configured to rest directly on said gasket (4*b*).

4. The solenoid valve (1) according to claim 1, comprising a filtering element (9) configured to filter impurities contained in said fluid entering said solenoid valve (1), said filtering element (9) being retained between said gasket (4*b*) and said hollow cylindrical body (6).

5. The solenoid valve (1) according to claim 4, wherein said filtering element (9) has a substantially circular shape having a central hole to enable said hollow cylindrical body (6) to be inserted into said gasket (4*b*).

6. The solenoid valve (1) according to claim 1, wherein said box-shaped body (3) comprises a coil (3*c*) configured to supply an electric current to said solenoid (3*a*) so as to create a magnetic field to move said core (3*b*).

7. The solenoid valve (1) according to claim 1, wherein said solenoid (3*a*) comprises a portion (3*a*') projecting partially from said box-shaped body (3) and configured to engage by shape coupling within a suitable opening of a fixing component (4*a*), fixed to or fixable to said box-shaped body (3) and defining the passage seat (5) for the core (3*b*).

8. The solenoid valve (1) according to claim 1, comprising a seal element (7) configured to wrap externally said connecting body (4), said seal element (7) having an end engaged with said box-shaped body (3), through the engagement of reversible hooking means (8), and a second end engaged with said nozzle body (2).

9. The solenoid valve (1) according to claim 8, wherein said reversible hooking means (8) enables locking and unlocking the box-shaped body (3) on the seal element (7) to enable the coil (3*c*) to be replaced.

10. The solenoid valve (1) according to claim 1, wherein said solenoid (3*a*) traverses the box-shaped body (3) until it exits with a head portion (31*a*) from the box-shaped body (3); said head portion (31*a*) being engageable with reversible hooking means (8) to promote a removable connection of the box-shaped body (3) to the solenoid (3*a*).

11. The solenoid valve (1) according to claim 1, wherein the first surface is a crown surface that rests directly on the gasket (4*b*).

12. The solenoid valve (1) according to claim 11, wherein the crown surface is partially inserted in the passage seat (5).

13. The solenoid valve (1) according to claim 1, wherein the hollow cylindrical body (6) has a second surface at least partially inserted in the outlet conduit (2*c*").

14. The solenoid valve (1) according to claim 13, wherein the second surface of the hollow cylindrical body (6) is positioned opposite to the first surface of the hollow cylindrical body (6).

15. The solenoid valve (1) according to claim 1, wherein the hollow cylindrical body (6) is pressed firmly in the main conduit (4*b*') of the gasket (4*b*).

16. The solenoid valve (1) according to claim 1, wherein the hollow cylindrical body (6) is fitted in and directly contacts the main conduit (4*b*') of the gasket (4*b*).

17. A spare parts kit for a solenoid valve (1) according to claim 1 comprising one or more of the following elements:

a replacement solenoid (30*a*) replacing a corresponding worn solenoid (3*a*);

a replacement movable core (30*b*) replacing a corresponding worn movable core (3*b*);

a replacement gasket (40*b*) replacing a corresponding worn gasket (4*b*);

a replacement hollow cylindrical body (60) replacing a corresponding worn hollow cylindrical body (6);

a replacement filtering element (90) of a corresponding worn filtering element (9).

* * * * *